May 24, 1949. A. T. REYNOLDS 2,471,122
INTERCHANGE MECHANISM BETWEEN TWO POWER-SOURCES
Filed Sept. 18, 1946 4 Sheets-Sheet 1

INVENTOR.
Artie T Reynolds

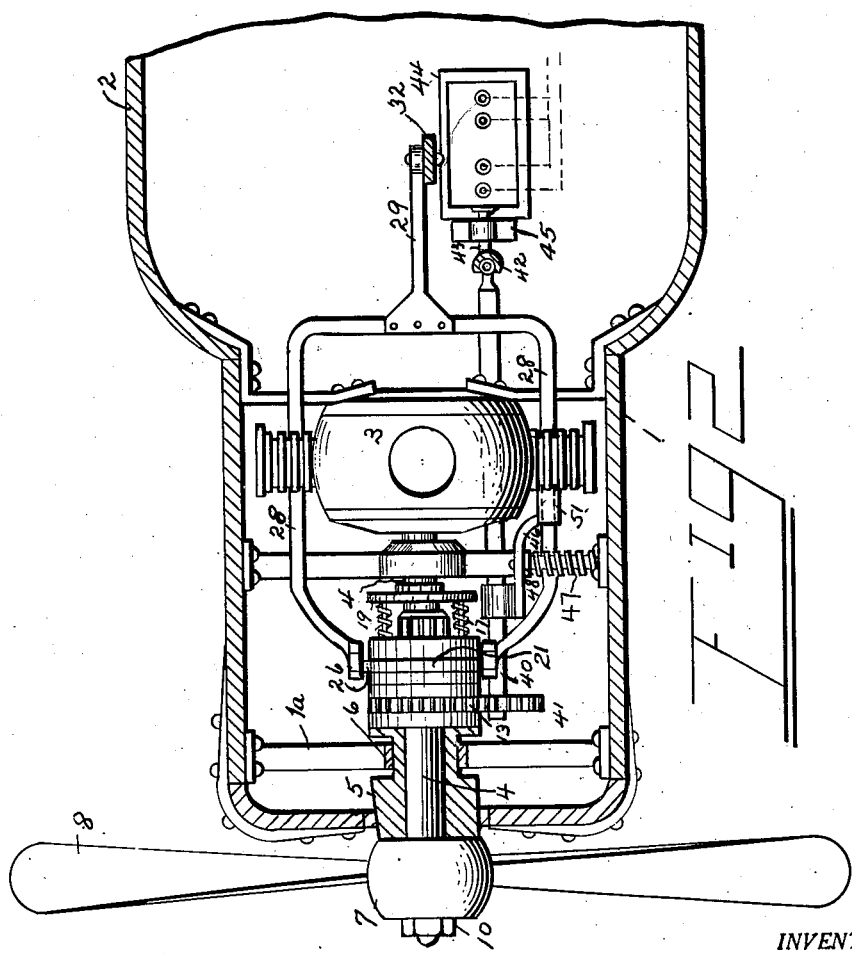

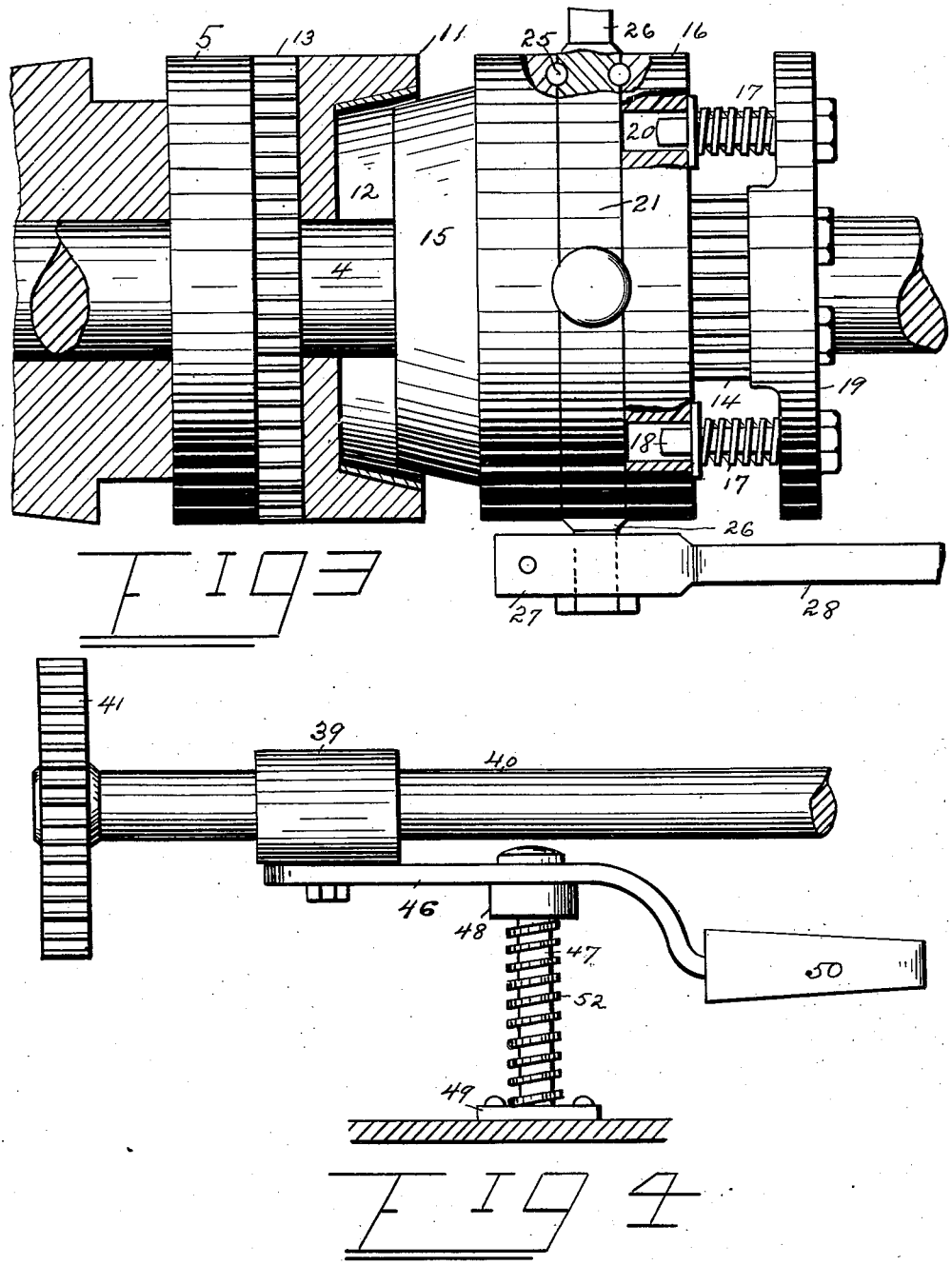

May 24, 1949. A. T. REYNOLDS 2,471,122
INTERCHANGE MECHANISM BETWEEN TWO POWER-SOURCES
Filed Sept. 18, 1946 4 Sheets-Sheet 4

INVENTOR.
Artie T Reynolds

Patented May 24, 1949

2,471,122

UNITED STATES PATENT OFFICE 2,471,122

INTERCHANGE MECHANISM BETWEEN TWO POWER SOURCES

Artie Thomas Reynolds, McAlester, Okla.

Application September 18, 1946, Serial No. 697,688

3 Claims. (Cl. 74—389)

1

This invention relates to multiple driving or driven elements of gearing mechanisms, and especially to an improved interchange mechanism between two power-sources; and, more specifically, to a primary motor with its primary transmission means, a secondary motor with its secondary transmission means, and a power-driven unit with which the primary and secondary transmission means are alternately engageable for operating the power-driven unit in the same direction by either one of the two power-sources.

The invention includes means for association of the secondary means operatively with the power-driven unit, when the primary means are disconnected.

It is a primary object of the invention to continue the operation of the power driven unit upon failure of the primary means to operate, by supplying the motion through a secondary means.

It is therefore also an object of the invention to mechanically connect and disconnect both the primary and the secondary means, intermittently, at will and selectively as the need shall demand.

As showing the nature of the invention, in a simpler form, the same is illustrated, rather diagrammatically, in connection with an airplane; but by no means is it necessary that the invention shall be exclusively so employed, but may be used in connection with any mechanical assembly requiring such shunting from a primary to a secondary source of power.

The type of plane is also immaterial, as is also the shown arrangement of parts, which may be modified or re-arranged so long as the primary purpose of the invention is maintained.

On the sheets of drawing, accompanying and forming a part of this specification, Fig. 1 is a view showing the front end portion of an airplane-fuselage and propeller-bearing in longitudinal vertical central section and containing the novel combination of elements that constitutes my invention, shown conventionally;

Fig. 2 is a view in which the front part of the fuselage is shown in longitudinal horizontal section, and in which most of the novel combination of elements is shown as a top-plan view;

Fig. 3 is an enlarged view of a clutching mechanism, partly in section, as a part of my invention;

Fig. 4 is a detail view, in side elevation, of a tiltable secondary shaft and control for the shaft of the secondary power unit;

2

Figure 5:
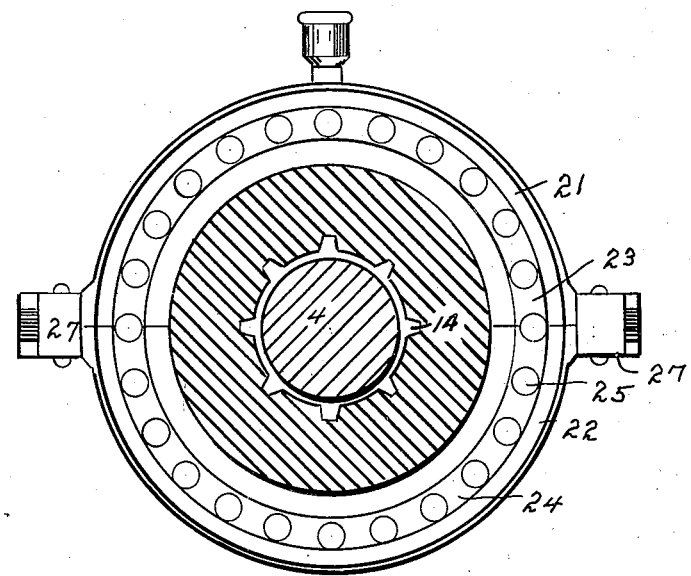
Figure 6:
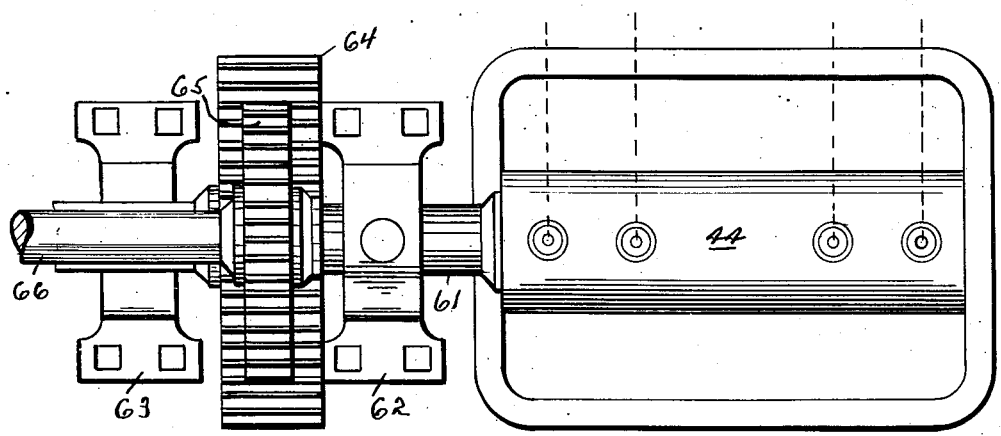

Fig. 5 is a cross sectional view of the clutch-construction showing the split collar, the anti-friction bearings, and the splines on the main driving shaft;

Fig. 6 is a plan view of a modified form of secondary mechanism in which two motor-driven shafts and two speed-change gears are substituted for the single secondary shaft of Figs. 1, 2, 3, 4 and 5.

In these several views, similar characters of reference indicate similar parts. The primary power-unit, as well as the secondary power-unit are only purposely shown diagrammatically; and omitting parts which would confuse other essential parts, and which omitted parts constitute no essential part of the invention.

However, the diagrammatic engine outlines are designed to show the usual motor in an airplane (with its appurtenances omitted), and the secondary power may be suitably generated electrically, or otherwise driven.

Within the cowl 1 of any suitable type of airplane, part of the body or fuselage 2 whereof is shown, is located the primary motor 3, which operates a driving shaft 4. Upon this driving shaft 4 rotates a sleeve 5 which is controlled in a bearing 6 carried by a strut 1a that is secured to the walls of the cowl. This sleeve 5 carries (integral therewith) a hub 7 from which extend the propeller blades 8 and 9. The sleeve and hub are held to the shaft 4 by a nut 10.

By reference to the enlarged view of Figure 3, it will be seen that the inner end of the sleeve 5 is provided with a female element of a clutch 11, and is lined at 12 with any suitable friction banding, such as rawhide, or the like.

Forward of the clutch-element 11 (and about the periphery of the sleeve 5) is a gear 13 which may either be cut into the body of the clutch-element 5, or the gear ring may be applied to the body of the sleeve 5. This gear is designed to mesh with a secondary gear, operated by a secondary power-shaft, operable from a secondary power-unit.

Mounted for axial sliding movement upon a multi-spline element 14, on and united with the main driving shaft 4, is the male element 15 of the clutch assembly, and is carried by a peripherally grooved hub 16, which is subjected to the clutching pressure of compression springs 17, disposed helically about guides 18 that are threaded into a plate 19 which is mounted on the shaft 4 for rotation therewith and with the element 14. The guides 18 project into openings 20 in the hub 16 of the male member 15 of the clutch.

Movably mounted in the groove in the hub 16 are two halves 21 and 22 of a split collar (see Figure 5), provided with ball-races 23 and 24 to retain ball bearings 25, so that the split collar has free movement in the groove, the walls whereof being also provided with like races for said ball bearings.

The halves 21 and 22 are provided with lateral studs 26, to which are applied bearings 27 formed on the end of elongated arms 28 which extend outwardly from the bearings 27 sufficiently to pass the body of the primary motor 3 and these arms 28 are united with an arm 29 (see Figure 2).

In the cabin 30, and in association with an operator's seat 31, is a lever 32 which is fulcrumed at 33 to a brace 34, united with the floor 35. This lever 34, beyond its fulcrum, is pivoted at 36 to the arm 29. The lever 32 is controllable by a latch 37 which co-operates with a segment 38, united with the floor 35 and within the reach of the operator at the seat 31.

Upon moving the upper end of lever 32 forward, the clutchhead 16 will recede from the part 11 of sleeve 5, and leave the latter idle upon the shaft 4.

In a bearing 39, is a secondary shaft 40 to which is applied a gear 41 which normally is disposed away from the periphery of the gear 13, and this shaft is connected, through a universal joint 42, with a shaft 43 of a secondary motor 44, the latter shaft being journalled in a bearing 45.

The bearing 39 is carried upon an arm 46 which is fulcrumed upon a shaft 47 (see Figure 4), which is journalled in bearings 48 and 49; and this arm 46 terminates in a shoe 50.

On the arm 28, nearest the secondary shaft 40, is a cam 51 (Figure 2) with an inclined underface. The shoe 50 is inclined and against the face of the cam 51, but free to move with relation thereto.

Upon shifting the upper end of the lever 32 forward, the arm 28 will move rearwardly, and cause the cam-face of the cam 51 to slide on the shoe, pressing it downwardly, thus tilting the arm 46 and lifting the bearing 39 and causing the gear 41 to operatively engage with the gear 13; so the secondary motor 44 and secondary transmission mechanism thereby takes on the opation of the shaft 4, while the primary motor 3 and clutch-mechanism (Figure 3) are relieved from operating the shaft 4.

When it is desired to again operate the shaft 4 from the primary motor 3, the upper end of lever 32 is pulled to a rearward position, thus closing the clutch, and this same motion of lever 32 will allow the shaft 40 to move and disconnect the gear 41 from the gear 12. The shifting mechanism is controlled by a spring 52 (Figure 4), connected to the bearing 48 and to the support 49 in a proper relation to yieldingly hold the gear-wheel 41 out of engagement with the gear-wheel 13 when the airplane is inverted or very unsteady when in operation.

Figure 1:
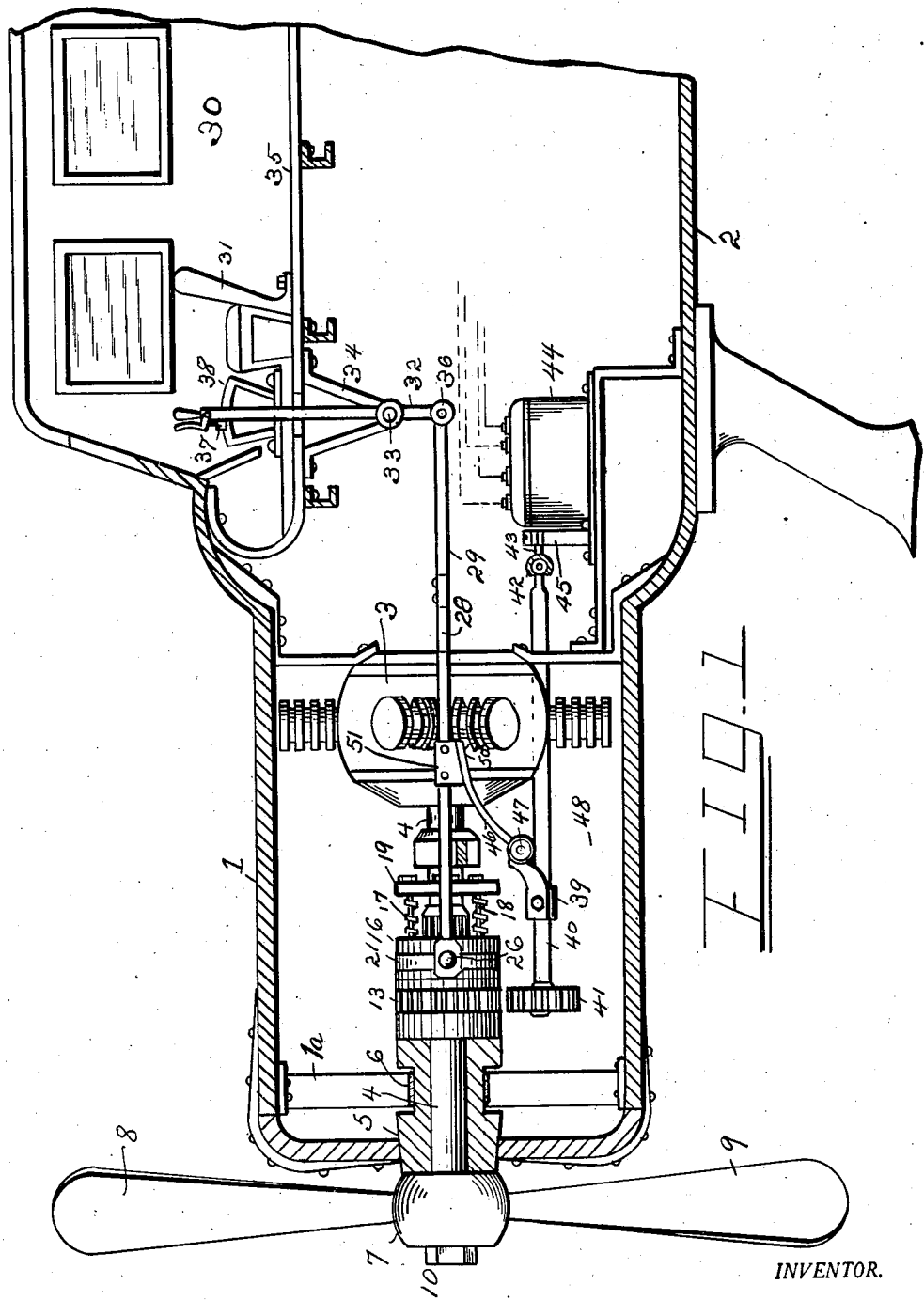

In Fig. 6 the secondary motor is shown at 60 with its shaft 61 journalled in two bearings 62 and 63, between which is located a gear 64, and meshing with this gear is gear 65 mounted on a shaft 66 corresponding to the secondary shaft 40 of Fig. 1.

In the modifications shown in Fig. 6, wherein the secondary motor 44 is substantially the same as that of Figs. 1 and 2, the reference numeral 61 indicates a rigid extension of the motor-shaft journalled in a bearing 62 and having a driving gear 64 united therewith. A bearing 63 has a joined secondary shaft 66 journalled therein, and this secondary shaft has a gear 65 thereon of less diameter than the gear 64; so this arrangement constitutes a change-speed mechanism.

Though I have shown and described several different forms of this invention, I have no intention to limit my patent protection to the precise details of such disclosure, for this invention is susceptible of numerous changes within the scope of the invention ideas as implied and claimed.

My invention is claimed as follows:

1. In a power-interchange mechanism, the combination of a driven element that includes a gear-wheel and a clutch element, a primary motor, a primary driving shaft operatively connected to said primary motor and journalled in said driven element, a clutch-element secured on said primary driving shaft and movable into and out of cooperative engagement with the first said clutch-element, a secondary driving shaft, a secondary motor operatively connected to said secondary driving shaft so as to effect rotation of the latter, a secondary gear-wheel united with said secondary shaft, means to shift the second-said clutch-element out of engagement with the first-said clutch-element, and means cooperative with the first-said means and with said secondary driving shaft for moving said secondary gear-wheel into operative engagement with the first-said gear-wheel.

2. The combination defined by claim 1, spring-means on said primary driving shaft for yieldingly holding the second-said clutch-element in engagement with the first-said clutch-element, and means cooperative with said secondary driving shaft for yieldingly holding said secondary gear-wheel out of engagement with the first-said gear-wheel.

3. The combination defined by claim 1, said driven element comprising a propeller-hub and containing a peripheral groove, a journal-bearing for said tubular driven element, the bottom and walls of said peripheral groove being a journal that is adapted to rotate in said journal-bearing while the bearing is between said walls and thereby limits movements of said tubular driven element along its axis.

ARTIE THOMAS REYNOLDS.

REFERENCES CITED

The following references are of record in the file of this patent:

UNITED STATES PATENTS

| Number | Name | Date |
|---|---|---|
| 1,826,466 | Harnischfeger | Oct. 6, 1931 |